US012561693B2

(12) United States Patent
Decker et al.

(10) Patent No.: US 12,561,693 B2
(45) Date of Patent: Feb. 24, 2026

(54) AGENT ATTENTION CAPACITY MODELING

(71) Applicant: Twilio Inc., San Francisco, CA (US)

(72) Inventors: Laura Decker, San Francisco, CA (US); Torsten Budesheim, Mill Valley, CA (US); Mark Brazinski, San Francisco, CA (US); Dipesh Chauhan, San Francisco, CA (US)

(73) Assignee: Twilio Inc., San Francisco, CA (US)

( * ) Notice: Subject to any disclaimer, the term of this patent is extended or adjusted under 35 U.S.C. 154(b) by 391 days.

(21) Appl. No.: 18/198,545

(22) Filed: May 17, 2023

(65) Prior Publication Data

US 2024/0386434 A1 Nov. 21, 2024

(51) Int. Cl.
G06Q 30/015 (2023.01)
G06Q 10/0631 (2023.01)
G06Q 30/016 (2023.01)

(52) U.S. Cl.
CPC ..... G06Q 30/015 (2023.01); G06Q 10/06311 (2013.01)

(58) Field of Classification Search
CPC ........... G06Q 30/015; G06Q 10/06311; G06Q 30/016
USPC ............ 379/265.11, 265.14, 265.05, 265.07, 379/265.01, 242
See application file for complete search history.

(56) References Cited

U.S. PATENT DOCUMENTS 10,496,438 B1 * 12/2019 Rizvi ............... G06Q 10/06311
11,018,959 B1 * 5/2021 Neill ....................... H04L 43/04

* cited by examiner

*Primary Examiner* — Thjuan K Addy
(74) *Attorney, Agent, or Firm* — Schwegman Lundberg & Woessner, P.A.

(57) ABSTRACT

An attention capacity service for an omnichannel customer interaction system or omnichannel contact center service is presented. The attention capacity service leverages an agent attention capacity model to generate in real-time an available attention value for each agent, where the available attention value is used across all configured channels in the omnichannel customer interaction system to make customer interaction routing decisions.

20 Claims, 9 Drawing Sheets

Figure 5:
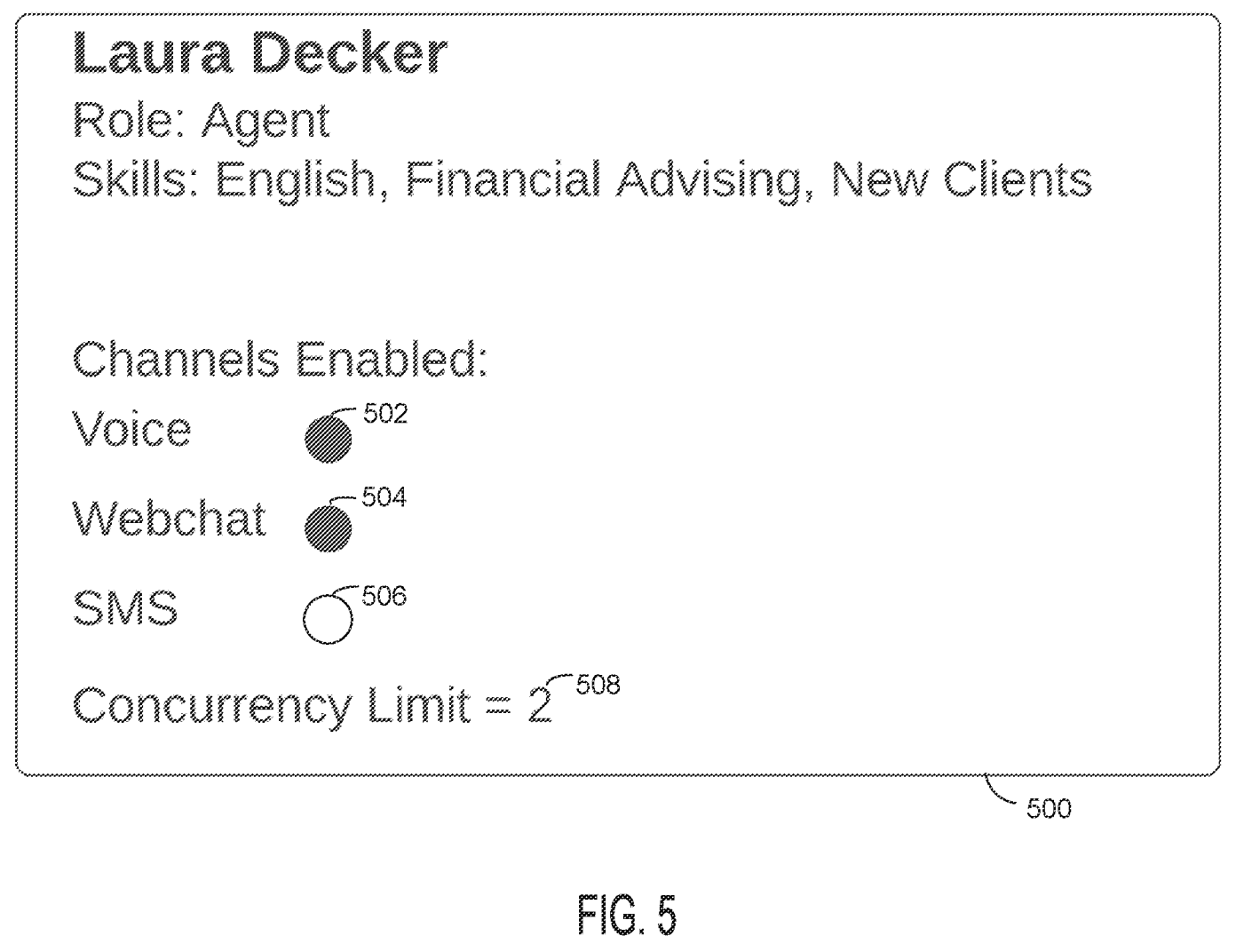

Laura Decker

Role: Agent

Skills: English, Financial Advising, New Clients

Channels Enabled:

Voice    502

Webchat    504

SMS    506

Concurrency Limit = 2    508

AGENT ATTENTION CAPACITY MODELING

TECHNICAL FIELD

The present application generally relates to a server-based system and service for modeling the attention capacity of agents in an omnichannel customer interaction system, or contact center system. More specifically, the present application describes an attention capacity service that provides for each end-user (e.g., agent end-user) who is handling customer interactions a real-time (or, runtime) available attention value, where the value can be used by a customer interaction router to make routing decisions.

BACKGROUND

Historically, enterprises and organizations have deployed customer interaction systems, with customer representatives or contact agents ("agents") dedicated to serving customer issues, taking inquiries, processing orders, and the like. A one-channel or single-channel call center is one where customers can only interact with the company through a single communication channel, typically over the phone. In these types of call centers, customers are limited to speaking with agents over the phone to resolve their issues or inquiries.

As technology has advanced, companies have started to incorporate multiple communication channels like video, voice, email, webchat, SMS, and social media, creating what is known as a multi-channel call center. This approach has allowed customers to interact with companies on the channels that they prefer, providing greater flexibility and convenience. However, the challenge with multi-channel call centers has been that each channel operates in a silo, and customer information is not easily shared across channels, which has led to a disjointed experience for customers. That's where omnichannel call centers come in.

An omnichannel call center integrates all of the communication channels into one platform, allowing customers to seamlessly move between channels while still receiving personalized service. Agents have access to all of a customer's interaction history, regardless of which channel the customer used, allowing them to provide more efficient and personalized support. For example, if a customer's initial inquiry is made via telephone, and handled by a first agent, when the customer later initiates a webchat, the agent who handles the webchat is provided with historical data about the customer's previous voice call.

The omnichannel approach is a more customer-centric model and provides a better customer experience, leading to higher customer satisfaction and loyalty. As a result, many enterprises are adopting this approach to meet the evolving expectations of customers in today's digital age. However, implementing an omnichannel contact center presents a variety of technical challenges.

BRIEF DESCRIPTION OF THE DRAWINGS

Embodiments of the present invention are illustrated by way of example and not limitation in the figures of the accompanying drawings, in which:

FIG. 5 is a user interface diagram illustrating an example user interface via which an administrative or managerial end-user may provide configuration data to configure an agent profile for an agent, according to one example.

DETAILED DESCRIPTION

Described herein are systems and methods for modeling the attention capacity of an agent of a contact center. More specifically, described herein is a software-based service, configurable on a per-enterprise customer basis, and which generates a runtime available attention value for an agent based on the agent's real-time allocation of customer interactions, by channel. In the following description, for purposes of explanation, numerous specific details and features are set forth in order to provide a thorough understanding of the various aspects of different embodiments of the present invention. It will be evident, however, to one skilled in the art, that the present invention may be practiced and/or implemented with varying combinations of the many details and features presented herein.

In the context of an omnichannel contact center, managing the attention capacity of a contact agent can be challenging for a variety of reasons.

Increased workload: In an omnichannel contact center, agents need to handle multiple channels, and in many instances, simultaneously, which can increase their workload and reduce their attention capacity. They may need to switch between different channels frequently, which can be mentally demanding and reduce their ability to focus on any one task.

Complexity of channels: Different channels have different requirements and nuances, which can be difficult for agents to manage simultaneously. For example, responding to a customer's email requires a different approach than handling a customer's chat request or phone call. Agents need to be skilled in managing multiple channels and adapting their communication style accordingly.

Interruptions: In an omnichannel contact center, agents may face frequent interruptions due to incoming requests from different channels. This can make it difficult for them to complete their current task or stay focused on the customer they are currently helping.

Information overload: Omnichannel contact centers generate a large amount of data, and agents need to quickly process and analyze this data to provide personalized support. This can be overwhelming and reduce their attention capacity.

Figure 1:
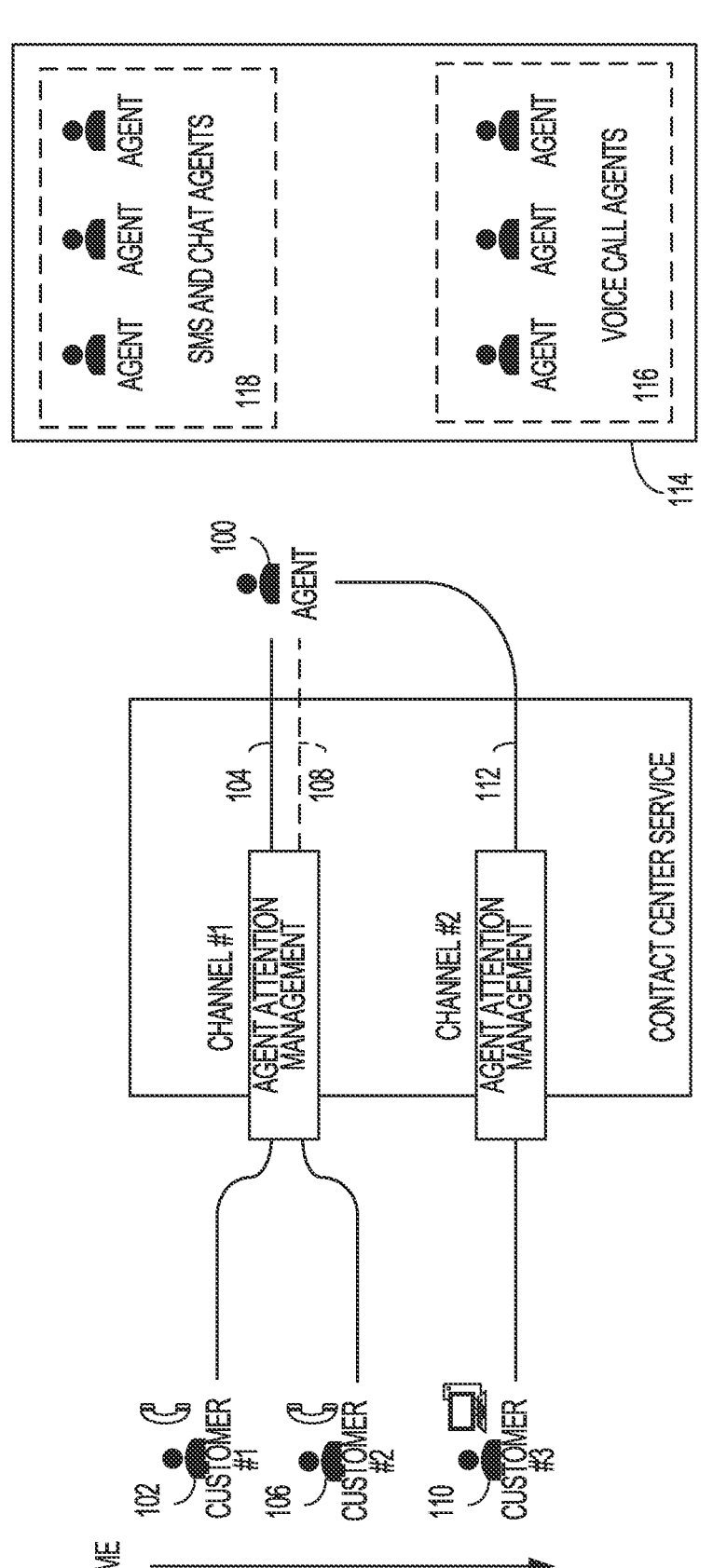
FIG. 1 is a diagram illustrating a conventional contact center platform or service with a task router that manages agent attention capacity on a per channel basis.

As illustrated in FIG. 1, with many conventional omnichannel contact centers, if there is any management or monitoring of an agent's attention, it tends to be done on a per-channel basis. Each channel may be configured to have a maximum concurrency which has no relationship to the concurrency in other channels. Here, the maximum concurrency of a channel is the maximum number of simultaneous customer interactions that any one agent is allowed to handle, for that specific channel, simultaneously. The consequence of this is that if an agent profile for an agent is configured so the agent is enabled for handling customer interactions via multiple channels, any one agent might approach maximum concurrency on one channel while being seen as one-hundred percent available on another channel.

By way of example, as shown in FIG. 1, an agent 100 is actively engaged with a first customer 102 in a first customer interaction via a first communication channel (e.g., voice channel), as evidenced by the solid line with reference number 104. During the first customer interaction, a second customer 106 places a call to the customer contact service. However, because the agent 100 is currently engaged with the first customer 102, the second customer 106 is placed on hold, as evidenced by the dashed line with reference number 108. While the agent 100 is still engaged in the first customer interaction 102, and the second customer 106 is currently on hold 108, a third customer 110 begins a web-chat session. Because the agent attention capacity for the web-chat channel (e.g., channel #2) is managed independently of the agent attention capacity for the voice channel (e.g., channel #1), the web-chat session initiated by the third customer is routed to the agent 100, as shown by the line with reference 112. This occurs because each channel has independent management of the agent's attention capacity, as shown by the respective agent attention management modules 108-A and 108B.

As a work around, many enterprises choose to isolate channel configurations in separate queues to avoid overutilization of their agents. For instance, as shown with reference 114, some enterprises configure their agent profiles, or alternatively, configure their channels, so that one group of agents 116 is dedicated to receiving and handling customer interactions on one channel (e.g., voice), while another group of agents 118 is dedicated to handling customer interactions on a second channel (e.g., webchat). The choice to manage channels and queues this way prohibits the enterprise from reaping the full benefits of an omnichannel platform.

To address the aforementioned problems, described herein is an omnichannel customer interaction system that has an integrated attention capacity service for generating, in real-time, a runtime available attention value for each agent. The attention capacity service leverages a configurable attention capacity model. The attention capacity service is configured to use the model to generate for each agent a runtime available attention value. This runtime available attention value is then used, by a customer interaction router, to make routing decisions across all channels. Each communication channel (e.g., video, voice, webchat, SMS, email, and optionally others) is separately configurable to have a channel attention value that reflects the amount of agent attention that is consumed when an agent is engaged with a customer on that channel. For example, in many instances, a video or voice call may consume more of an agent's attention than responding to an email. Accordingly, each agent begins with an initial attention capacity (e.g., 100). As that agent is allocated to handle customer interactions on various channels, the initial attention capacity for the agent is reduced by the attention value for the channel, to reflect the attention that the customer interaction on the respective channel is consuming. As such, the runtime available attention value for the agent reflects the remaining level of attention that the agent has for new customer interactions, given his or her current allocation of customer interactions. A customer interaction router, which receives incoming customer interaction requests from various channels and routes those requests to available agents, will use the runtime attention value for each available agent as one of several inputs or factors in making routing decisions.

Advantageously, the channel attention value for each channel is configurable, for example, through an administrative user interface. For example, an administrator or manager may elect to configure each channel with an attention value that generally reflects an estimate of the tolerance that any customer may have for waiting on an agent to respond via that channel. For example, a customer may be less tolerant in waiting for an agent to respond when the customer interaction is on a video or voice channel, as compared with a channel for SMS or a channel for email. As such, the channel for video and the channel for voice may be configured with higher attention values than a channel for SMS or a channel for email.

Consistent with some embodiments, the attention capacity service is configurable at both a system level and at the agent level. For example, at the system level, an administrator for the service can establish a configurable attention value for each individual channel, which is intended to reflect the level of attention that an agent is presumed to provide when engaged with one customer on that specific channel. This system-level configuration will determine how, and to what extent, an agent multitasks over various combinations of channels. An administrator for the service can modify the system level configurations (e.g., the attention value for a channel) at any time. In addition to the system-level channel configuration settings, an administrator or agent manager is also provided with the ability to specify different channels with which each agent is allowed to engage with a customer. For example, via the agent configuration scheme, an administrator or an agent manager can enable, on a per-agent basis, the specific combination of channels via which any one agent is allowed to provide customer service. Accordingly, a first agent may be allowed to engage with customers on a voice channel, but not via webchat or SMS message channels, whereas a second agent can be configured so that the second agent is allowed to engage with customers on all available channels—that is, all channels that are enabled or supported for the enterprise customer. Additionally, an agent-level configuration may provide for the ability to specify a maximum limit for concurrent customer interactions-referred to herein as a concurrency limit. This concurrency limit may be defined for each agent, for all channels. For instance, if an agent's concurrency limit is set to two, then the agent is only allowed to have two concurrent active customer engagements or interactions, regardless of the combination of channel types for those customer engagements or interactions. An administrator or agent manager may modify an agent's agent-level configuration at any time, taking into considerations such factors as customer demand, agent scheduling, agent ability, or perhaps temporary disability. For example, an agent who is experiencing temporary displeasure from speaking, for example, due to an illness (e.g., an agent who may have a hoarse voice, or severe cough), may be configured, temporarily, to participate on text-based messaging channels only.

The customer interaction system is described herein as being an omnichannel system that facilitates communications between customers and agents. In various implementations, the interaction system may be configured so that only one channel is enabled, and therefore, as configured, the system may operate in a manner similar to a single channel system. Moreover, in any given implementation, the agent end-users and the customer end-users may be referred to in terms other than "agent" and "customer." For instance, an agent may be a representative of a company, but may also be a volunteer for an organization, or have some other relationship with the entity on whose behalf the end-user is serving, and thus may be referred to by a variety of names other than "agent." Similarly, in many implementations, particularly when the interaction system is deployed by a traditional company that has customers, the customer end-users are properly referred to as "customers." However, in a variety of alternative implementations, the end-user may be generally known and referred to by some name other than "customer." By way of example, an interaction system may be deployed for purposes of a political campaign, in which case the end-users may be referred to as voters. Similarly, in the context of a health care service, the end-users may be referred to as patients. In various other contexts, the customer end-users may be referred to by some other term. Other aspects and advantages of the various embodiments of the present invention will be readily apparent from the descriptions of the several figures that follows.

Figure 2:
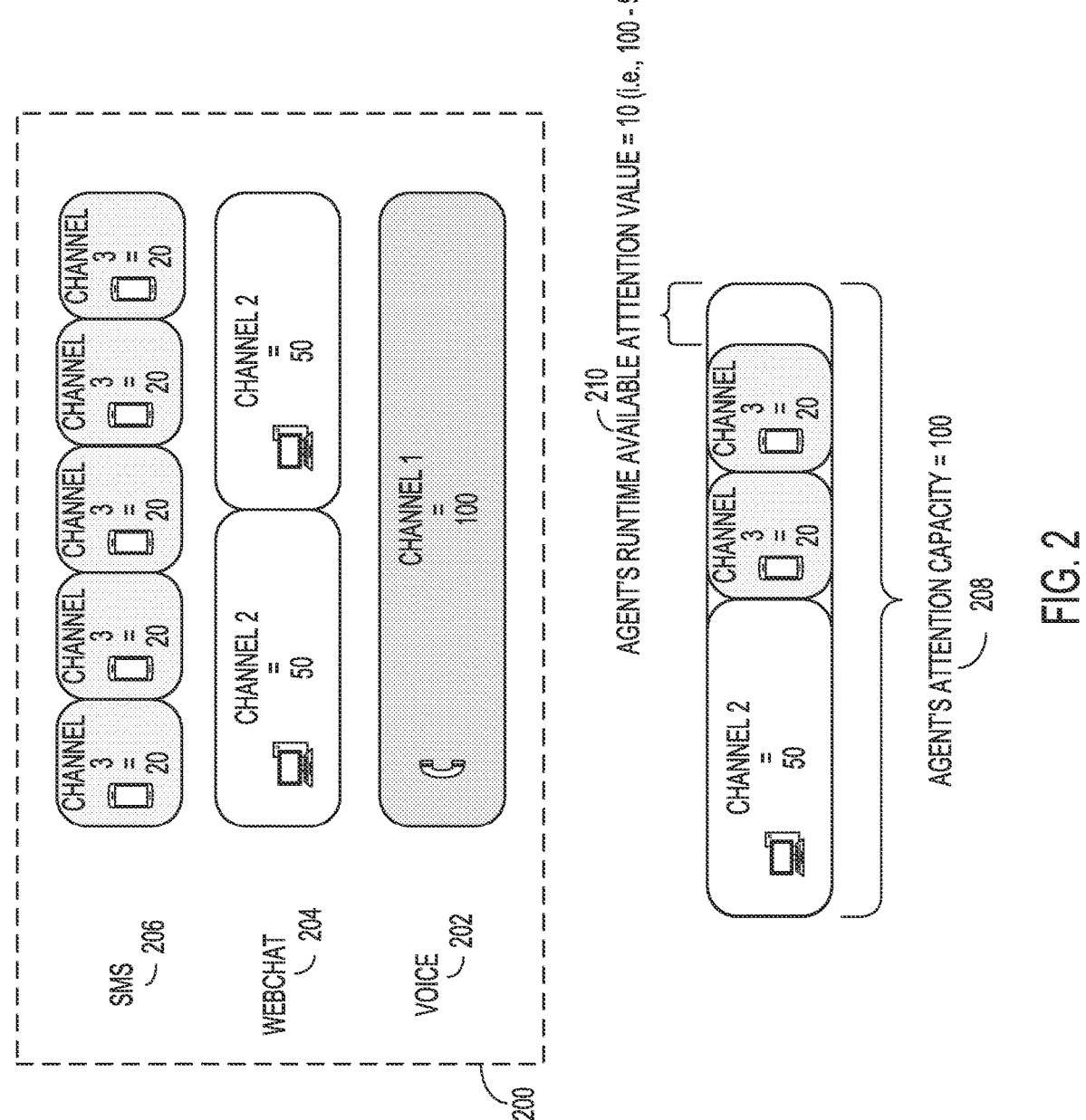
FIG. 2 is a diagram illustrating an example of an attention capacity model and showing how the model is used to establish a runtime available attention value for an agent, according to one example.

FIG. 2 is a diagram illustrating an example of an attention capacity model 200 and an example of how the model is used to establish a runtime available attention value for an agent, according to one example. In this example, the model 200 includes three communication channels-one each for voice 202, webchat 204, and SMS messaging 206. In other examples, various other channels may be included as part of the model 200. For instance, in some examples, a model may include a video communication channel, an email communication channel, one or more social media communication channels, and possibly other types of communication channels. Accordingly, the model shown in FIG. 2 is simply an example, and in various other implementations, many other communication channels could be similarly included.

As reflected in the example model 200, the voice channel 202 has been configured with a channel attention value of one hundred ("100"). Accordingly, in an example where an agent's attention capacity is also one hundred, an agent can only have one active customer interaction via the voice channel. In this example, the webchat channel 204 has been configured with a channel attention value of fifty ("50"). Accordingly, in this example, an agent might be allocated two customer interactions, simultaneously, on the webchat channel 204. Finally, the SMS channel 206 has been configured with a channel attention value of twenty ("20"). Accordingly, an agent might be allocated as many as five customer engagements or interactions, concurrently, via the SMS channel 206.

The attention capacity service leverages the model 200 by generating for each agent a runtime available attention value 210 for the agent. Here, the term runtime is intended to convey that the available attention value is derived in real-time, for example, in response to the agent receiving and/or accepting invitations to engage in customer interactions, and in completing those engagements, and so forth. As illustrated with reference number 208, an agent is configured to have an initial or default attention capacity. With some embodiments, the initial or default attention capacity value is set or fixed by the system. For instance, in this example, the agent's attention capacity is set by default to one hundred ("100"). However, in alternative embodiments, the initial or default attention capacity for an agent may be a configurable setting, such that an administrator for the enterprise customer can set the initial value.

Consistent with some examples and as described in greater detail below, each agent has an agent profile that is configurable. In some examples, the attention capacity of each agent may be fixed, by default. For instance, in some examples, every agent is assigned an attention capacity of one hundred ("100") by default. However, in other examples, the attention capacity of each agent may be configurable via the agent profile on a per agent basis. Furthermore, via the agent profile, each of the communication channels supported by the specific instance of the contact center for a particular enterprise customer can be enabled or disabled for each agent.

As an agent receives and accepts invitations to join communication channels and engage with customers, the attention capacity data store (320 of FIG. 3) of the attention capacity service derives the runtime available attention value 210 for the agent. At any given time, the runtime available attention value 210 for an agent is calculated as the difference between the agent's attention capacity, and the sum of the channel attention values for the various channels on which the agent is actively, and concurrently, handling customer interactions. For instance, as shown in FIG. 2 with reference 212, an agent is currently engaged in a customer interaction via a webchat, and two customer interactions via SMS. As such, the agent's runtime available attention 210, which reflects the agent's remaining available attention given his current allocation of customer interactions, is calculated as the difference between one hundred ("100") and ninety ("90"), where ninety is the sum of the channel attention values for the agent's active customer interactions.

With some embodiments, an agent's runtime attention value 201 is reduced when an agent is invited to participate in a customer engagement, as opposed to reducing the runtime attention value when the agent accepts the invitation. By adjusting the runtime attention value of the agent when an invitation is sent, the agent will not receive additional invitations unless the agent rejects the invitation, thereby increasing his or her runtime attention value. This prevents introducing unwanted delay into the system that may be caused by an agent receiving several invitations, only to redirect some of those invitations after the agent accepts one invitation, leading to a reduced real-time attention value.

Figure 3:
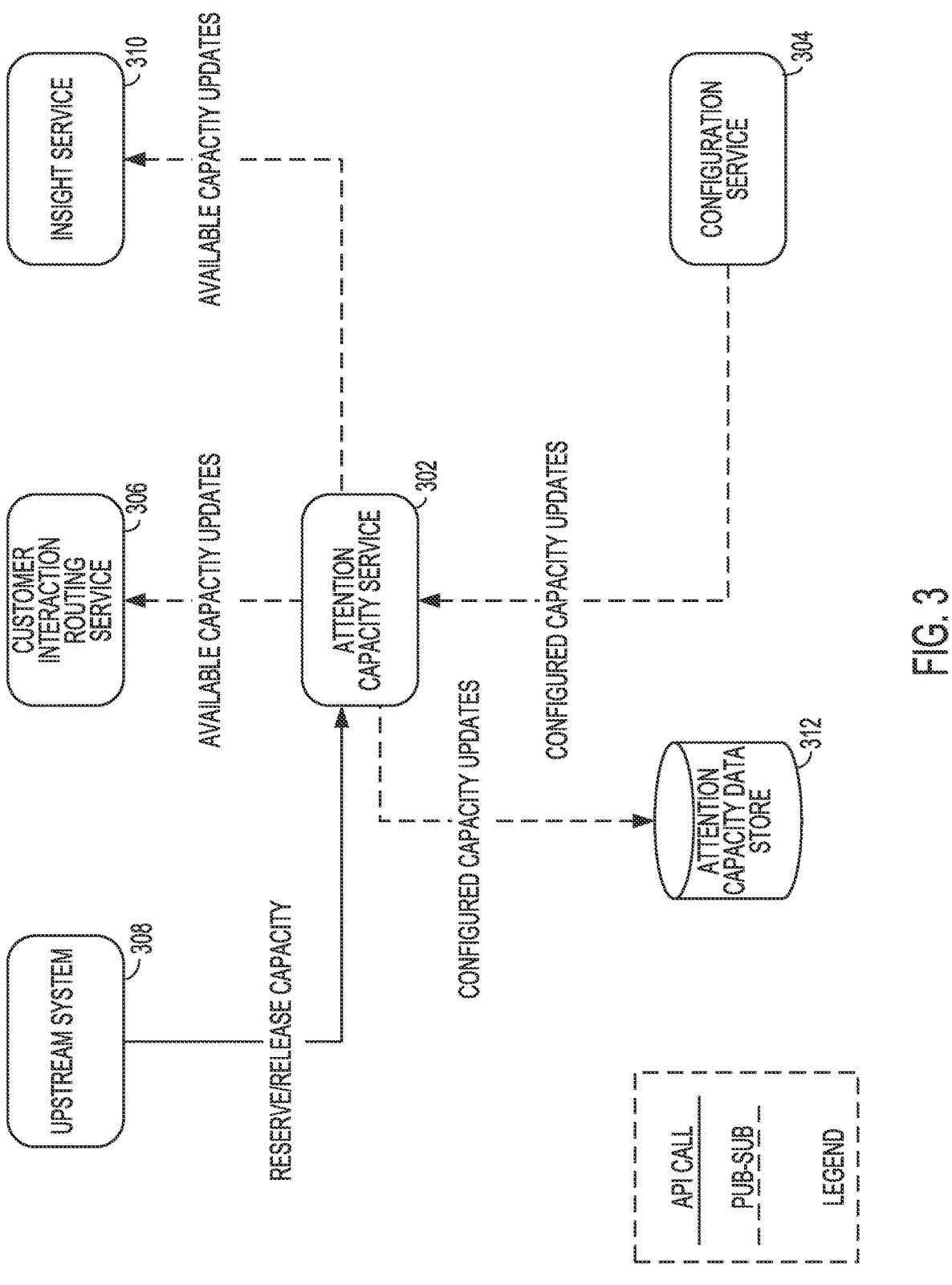
FIG. 3 is a system architecture diagram illustrating some of the functional components of an omnichannel customer interaction system, and more specifically an attention capacity service, according to one example.

FIG. 3 is a system architecture diagram illustrating some of the functional components of an omnichannel customer interaction system, and more specifically an attention capacity service 302, according to one example. Consistent with some examples, the omnichannel customer interaction system is implemented as a cloud-based system or platform that is offered to enterprise customers as a software-as-a-service (SaaS) solution. This means that enterprise customers can access and use the platform through a web browser without the need to install any software or hardware on their own servers.

Figure 4:
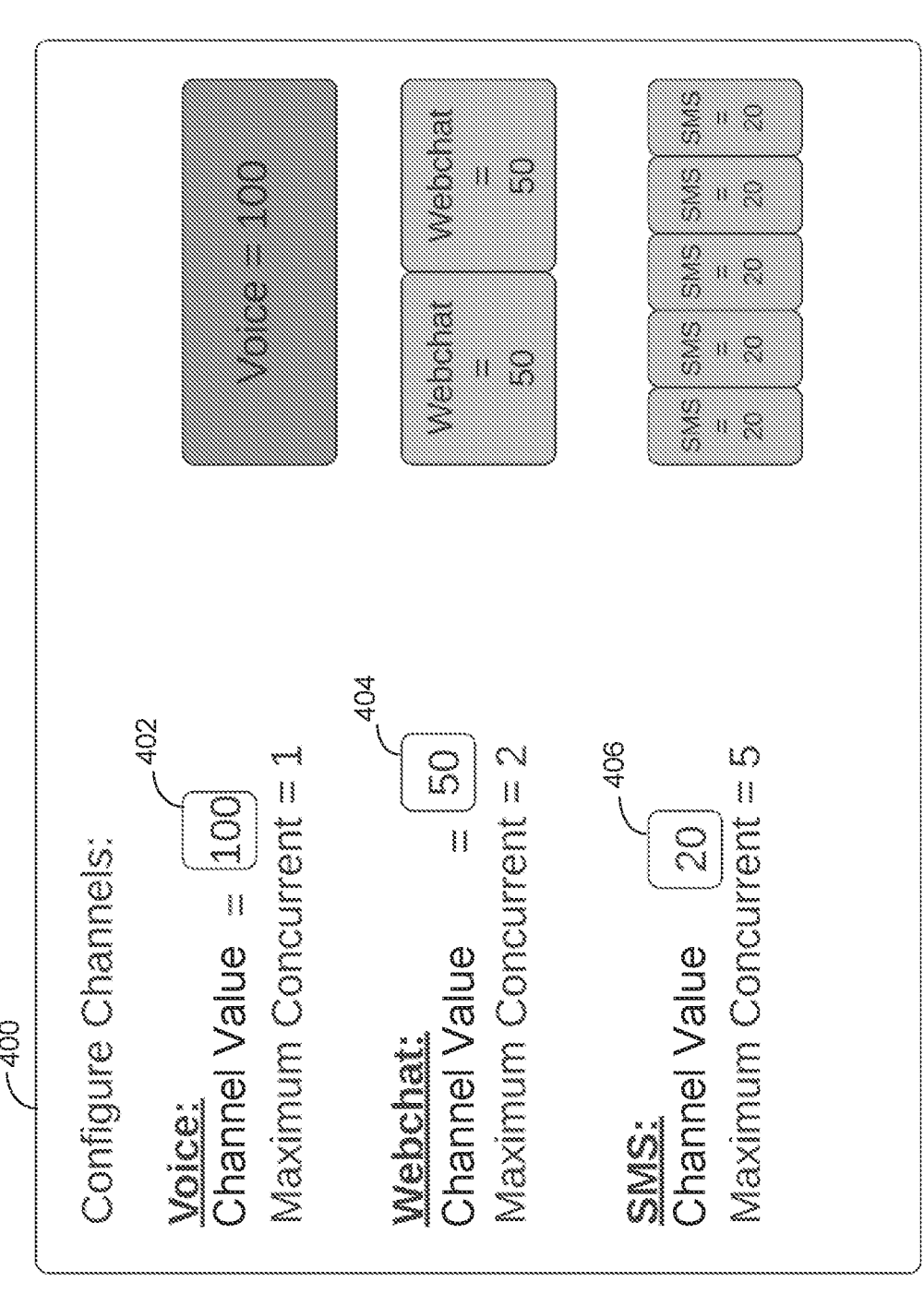
FIG. 4 is a user interface diagram illustrating an example user interface via which an administrative or managerial end-user may provide configuration data to configure a plurality of channels for use with the attention capacity service, according to one example.

As shown in FIG. 4, the attention capacity service 302 is communicatively coupled with a configuration service 304. More specifically, in this example, the attention capacity service 302 is a subscriber to event messages that are published by the configuration service 304. Accordingly, as an administrator or managerial end-user of the system interacts with a user interface provided by the configuration service, configuration data for the attention capacity service 302 may be published, causing the configuration data to be communicated from the configuration service 304, to the attention capacity service 302.

FIG. 4 is a user interface diagram illustrating an example user interface 400 via which an administrative or managerial end-user may provide configuration data to configure a plurality of channels for use with the omnichannel customer interaction system, and the attention capacity service 302 specifically, according to one example. In this example, the omnichannel customer interaction system is configured to have three communication channels-one each for voice, webchat, and SMS messaging. In other examples, the omnichannel customer interaction system may be configured to have more channels, less channels, or different combinations of communication channels. In the user interface 400, the end-user is prompted to enter a channel attention value for each of the various communication channels. Here, for the voice channel, the end-user has entered the channel attention value, one hundred ("100") 402. Accordingly, based on the end-user's input, the system has calculated the maximum concurrent customer interactions that any one agent can concurrently have on the voice channel. With a channel attention value of one hundred ("100"), the maximum number of allowed concurrent customer interactions for the voice channel is one ("1"). The administrative end-user has input a channel attention value of fifty ("50") 404 for the webchat channel, and a channel attention value of twenty ("20") 406 for the SMS channel. Based on these inputs, the system has calculated the maximum concurrent customer interactions for the respective channels.

Referring again to FIG. 3, once the administrative end-user has provided and submitted the configuration data for the various communication channels, the configuration details are consumed by upstream services to ensure that each time an agent engages with a customer via a channel, the appropriate channel attention values are deducted from the attention capacity of the agent.

The configuration service 304 provides a user interface 500 that allows an administrative or managerial end-user with the ability to update an agent profile for an agent. FIG. 5 is a user interface diagram illustrating an example user interface 500 via which an administrative or managerial end-user may provide configuration data to configure an agent profile for an agent, according to one example. In this example, the user interface 500 includes radial buttons 502, 504 and 506, that allow the end-user to select which communication channels the agent can participate in, such as voice and webchat. The selected radial buttons indicate that the agent is now able to engage with customers on those channels. The configuration data included in the agent profile is critical for routing incoming customer interactions to the most appropriate agent. The user interface 500 may also display other relevant information for the agent's profile. As with the channel configuration data, when the configuration service 304 publishes an event message relating to a configuration update to an agent profile, the attention capacity service 302 and the customer interaction routing service 306 will read the configuration data from the agent profile and use that information in making routing decisions.

Consistent with some embodiments, when configuring an agent profile for an agent, an administrator or agent manager can also establish a concurrency limit for the agent. The concurrency limit is a per-agent configuration setting. The concurrency limit overrides available attention for an agent and is used to set a more restrictive number on an agent's ability to multitask. For example, if the attention capacity service is configured at the system level (e.g., the attention values for the channels), such that an agent is allowed to have five concurrent SMS message sessions with different customers, the agent profile for a junior level agent may be configured with a value less than five, to prevent that particular junior level agent from being pushed past his or her multitasking limit. With a per-agent concurrency limit in place, an agent is qualified to take high-value customer engagements or interactions (e.g., such as a voice call with a channel attention value of one hundred), but the agent may be prevented from taking too many low-value customer engagements or interactions (such as a fifth SMS message that may overwhelm the agent).

Once an agent has an agent profile, the agent can log in to the system and begin handling customer engagement events or interactions. Although not shown here, the agent will be presented with a user interface that allows the agent to indicate his or her status, for example, as available for handling customer interactions, or unavailable. When the agent's current status is set to available, the attention capacity service 304 will publish an event message, indicating the agent's current available attention value. The customer interaction routing service 306, upon detecting the published message, will read or ingest the agent's current available attention value and channel availability. Accordingly, the agent's current available attention value can be used by the router 306 in making routing decisions.

When a customer invokes a customer interaction via a particular channel, the customer interaction routing service may route the incoming request to a specific agent who is determined to be qualified to handle the incoming request. While there may be many factors used in making this determination, the agent must of course have an online status, an agent profile indicating the specific channel type has been enabled for the agent, and a current available attention value that exceeds the attention value of the channel on which the incoming customer interaction request has been received.

In FIG. 3, the upstream system 308 is shown to convey that the omnichannel customer interaction system may have a variety of other functional components that are generally beyond the scope of the present invention. However, in some examples, the upstream system 30 communicates application programming interface ("API") requests to the attention capacity service 302, for example, to indicate when an agent has accepted an incoming customer interaction, on a particular channel, and when an agent has completed or finished a customer interaction, on a particular channel. Accordingly, the attention capacity service 302, upon receiving an API request, will process the request by updating the runtime available attention value for the agent. For instance, if the API request reflects that the agent has accepted an invitation to engage in a customer interaction on a specific channel, the attention capacity service will update the available attention value for the agent by reducing the current value by the channel attention value configured for the specific channel on which the agent has accepted the invitation to engage with the customer. Similarly, if the API request indicates that the agent has completed or finished a customer interaction on a specific channel, the attention capacity service will update the available attention value for the agent by adding back to the current available attention value of the agent, the channel attention value set for the specific channel on which the agent has recently completed the customer interaction. The processing of these API requests, and their impact on an agent's runtime available attention value are described in greater detail below, in connection with FIG. 6.

As shown in FIG. 3, the omnichannel customer interaction system includes an insight service 310. Consistent with some examples, the attention capacity service 302 will publish event messages, for example, when various updates are made to an agent's runtime available attention values. Accordingly, the insight service 310 provides a way for the agent, or an administrative or managerial end-user, to view real-time, and historical data regarding an agent's runtime available attention value.

Figure 6:
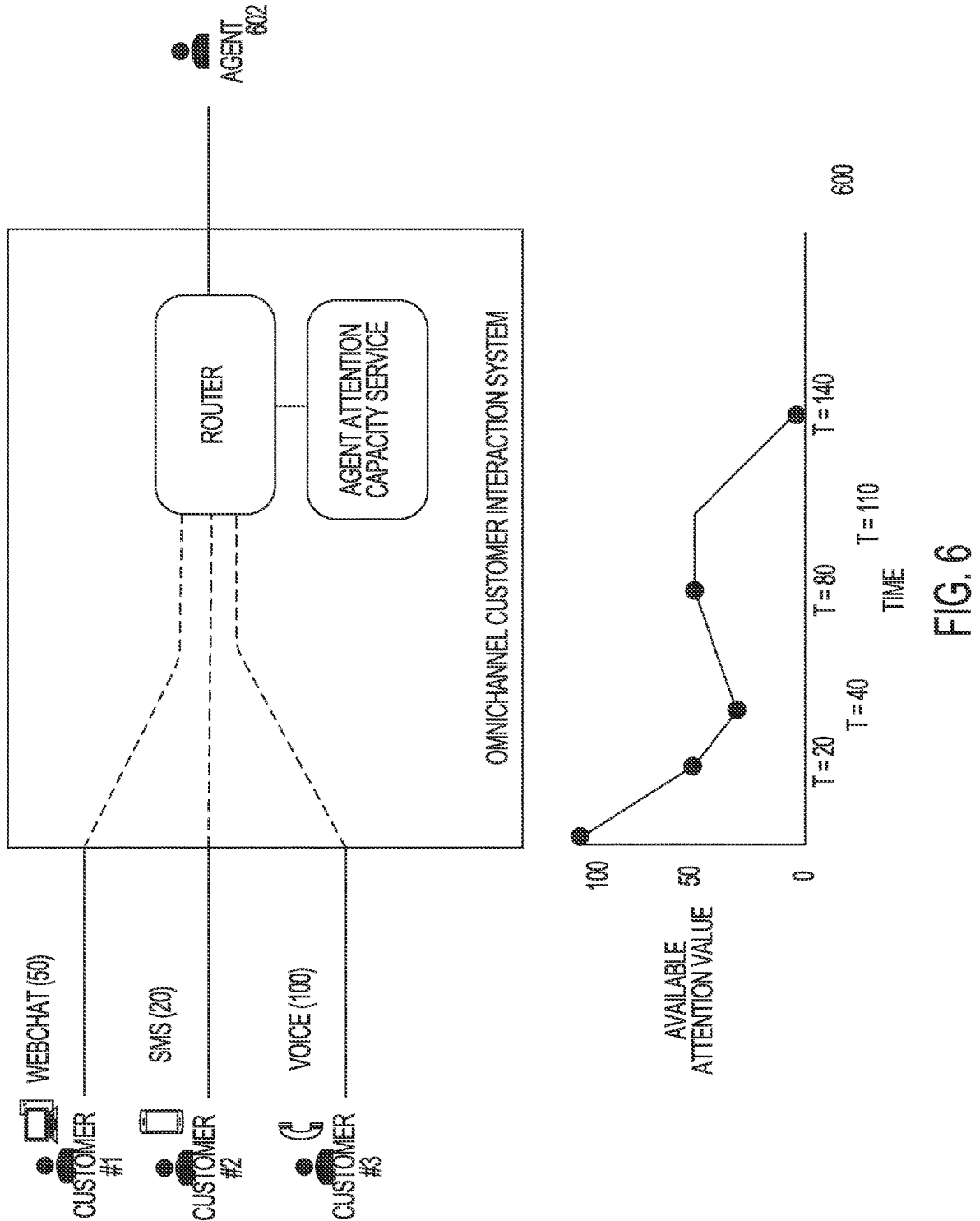
FIG. 6 is a system diagram illustrating an example of an omnichannel customer interaction system in action, according to one example.

FIG. 6 is a system diagram illustrating an example of an omnichannel customer interaction system in action, according to one example. As shown in FIG. 6, a graph 600 shows the available attention value of an agent 602 over time, as the agent accepts invitations to engage with customers and completes those customer interactions. As shown in the graph, the agent's initial available attention value is one hundred ("100"). Then, first customer (e.g., customer #1) initiates a webchat, which is routed to and accepted by the agent 602. Accordingly, the attention capacity service deducts from the initial available attention capacity (e.g., 100) the channel attention value configured for the webchat channel—in this example, fifty ("50"). Accordingly, as shown in the graph 600, at time t=20, the available attention value for the agent is fifty ("50").

Next, at time t=40, a second customer (e.g., customer #2) invokes an SMS session via the SMS channel, which is also routed to the agent 602. As shown in the graph, the agent's available attention value is further reduced by the channel attention value of the SMS channel. Accordingly, at time T=40, the agent's available attention value is thirty ("30")— reflecting the agent's ability to potentially handle one additional SMS messaging interaction.

At time T=80, the agent interacts with a user interface to indicate completion of the SMS messaging session with the second customer, and in response, the attention capacity service updates the agent's available attention value to fifty ("50"). Next, a third customer (e.g., customer #3) places a voice call to the system. Because the agent's current available attention value is fifty ("50") at time T=120, the router cannot send the agent an invitation to accept the customer interaction.

Consistent with some examples, the system may provide the agent with a user interface 700 and 702 to notify that agent that an incoming customer interaction is available but cannot be accepted until another customer interaction is completed. Two examples of such user interfaces are presented in FIG. 7. Specifically, in the user interface 700 of FIG. 7, an agent is notified that an incoming voice call is available, and the agent is provided with an option to accept the new voice call and temporarily place the voice call on hold. This allows the agent to accept a voice call even though it temporarily puts his available attention value about the maximum capacity. In the user interface 702, the voice call is assigned to the agent and waiting in an inactive state until the agent closes or pauses the current webchat.

Referring again to FIG. 6, at time T=110, the agent's available attention value is reduced to zero, and at time T=140, the third customer's voice call is taken off hold, as the agent ends the webchat session with the first customer (e.g., customer #1).

Machine Architecture

Figure 7:
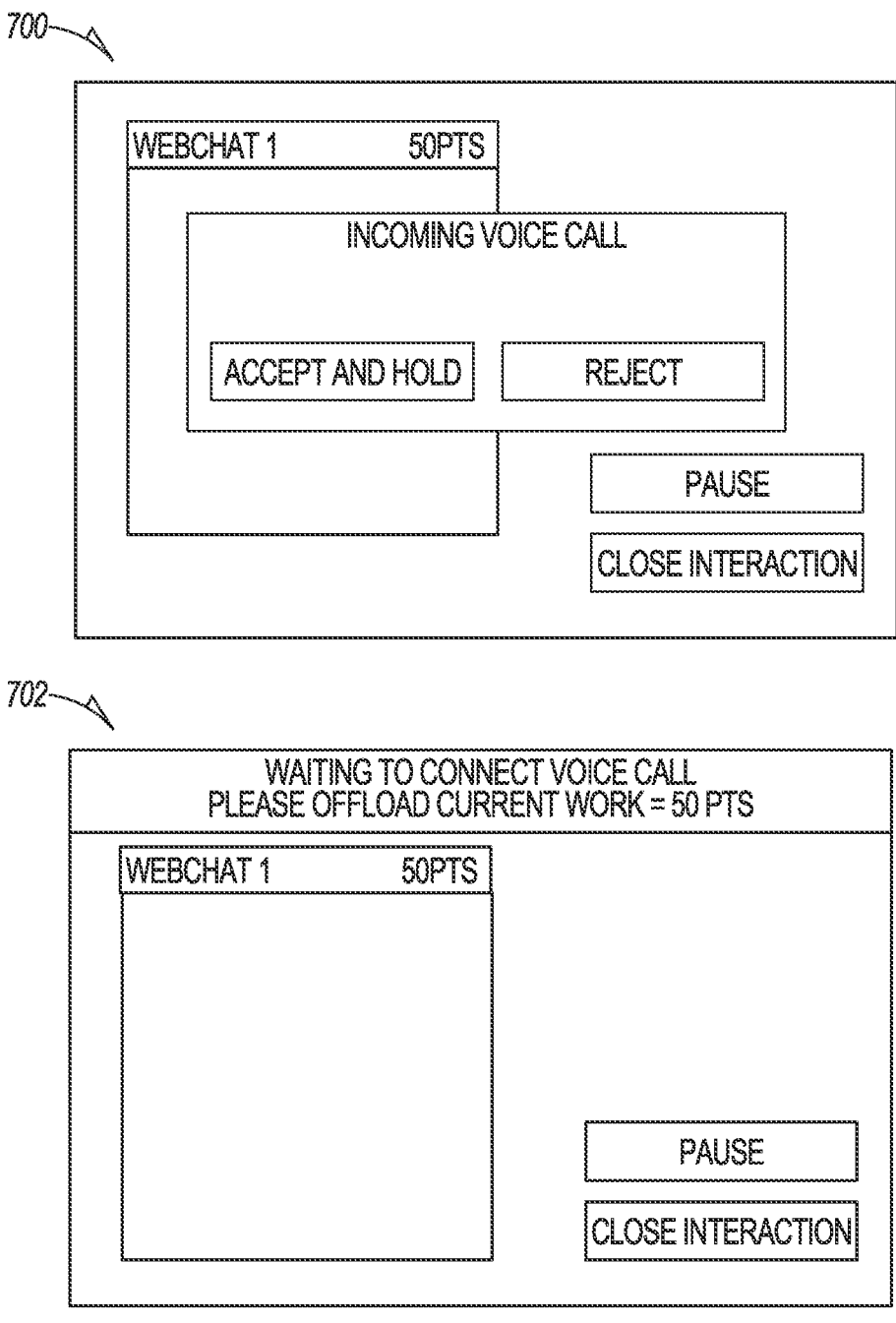
FIG. 7 illustrates two different example user interfaces where each user interface demonstrates an example of how an agent may be invited to engage in a customer interaction even when the agent's runtime available attention value indicates the agent may not currently have available attention, according to the examples.

FIG. 7 is a diagrammatic representation of a machine 800—sometimes referred to as a computing device-within which instructions 810 (e.g., software, a program, an application or app, or other executable code) for causing the machine 800 to perform any one or more of the methodologies discussed herein may be executed. For example, the instructions 810 may cause the machine 800 to execute any one or more of the methods described herein. The instructions 810 transform the general, non-programmed machine 800 into a particular machine 800 programmed to carry out the described and illustrated functions in the manner described. The machine 800 may operate as a standalone device or may be coupled (e.g., networked) to other machines. In a networked deployment, the machine 800 may operate in the capacity of a server machine or a client machine (e.g., client computing device) in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 810, sequentially or otherwise, that specify actions to be taken by the machine 800. Further, while a single machine 800 is illustrated, the term "machine" shall also be taken to include a collection of machines that individually or jointly execute the instructions 810 to perform any one or more of the methodologies discussed herein. The machine 800, for example, may comprise the client machine(s) 310 or any one of multiple server devices forming part of the customer data platform 300. In some examples, the machine 800 may also comprise both client and server systems, with certain operations of a particular method or algorithm being performed on the server-side and with certain operations of the particular method or algorithm being performed on the client-side.

Figure 8:
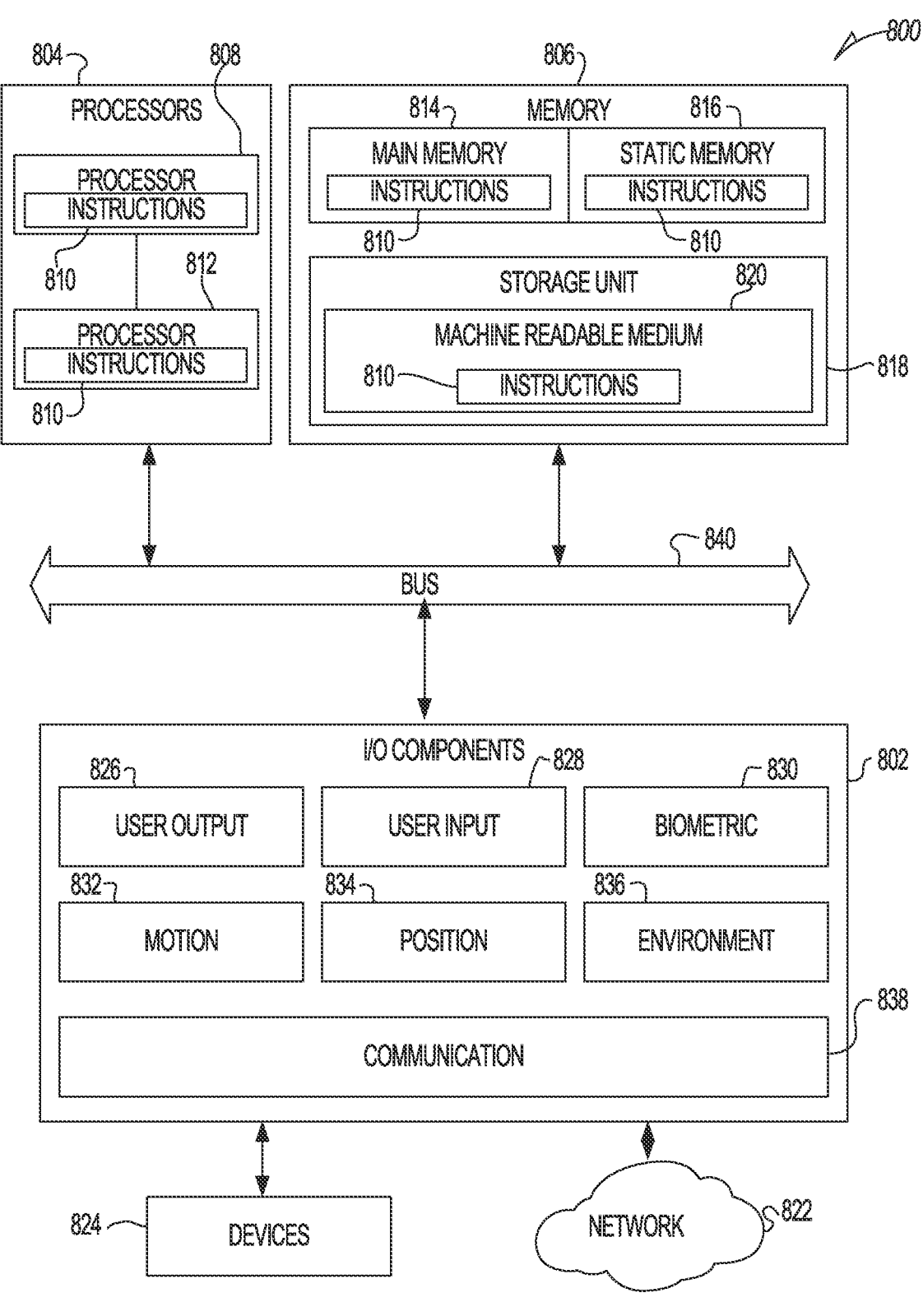
FIG. 8 is a diagrammatic representation of a computing device (e.g., a machine) within which instructions for causing the computing device to perform any one or more of the methodologies discussed herein may be stored and executed.

The machine 800 may include processors 804, memory 806, and input/output I/O components 802, which may be configured to communicate with each other via a bus 840. In an example, the processors 804 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 808 and a processor 812 that execute the instructions 810. The term "processor" is intended to include multi-core processors that may comprise two or more independent processors (sometimes referred to as "cores") that may execute instructions contemporaneously. Although FIG. 8 shows multiple processors 804, the machine 800 may include a single processor with a single core, a single processor with multiple cores (e.g., a multi-core processor), multiple processors with a single core, multiple processors with multiples cores, or any combination thereof.

The memory 806 includes a main memory 814, a static memory 816, and a storage unit 818, all accessible to the processors 804 via the bus 840. The main memory 806, the static memory 816, and storage unit 818 store the instructions 810 embodying any one or more of the methodologies or functions described herein. The instructions 810 may also reside, completely or partially, within the main memory 814, within the static memory 816, within machine-readable medium 820 within the storage unit 818, within at least one of the processors 804 (e.g., within the processor's cache memory), or any suitable combination thereof, during execution thereof by the machine 800.

The I/O components 802 may include a wide variety of components to receive input, provide output, produce output, transmit information, exchange information, capture measurements, and so on. The specific I/O components 802 that are included in a particular machine will depend on the type of machine. For example, portable machines such as mobile phones may include a touch input device or other such input mechanisms, while a headless server machine will likely not include such a touch input device. It will be appreciated that the I/O components 802 may include many other components that are not shown in FIG. 8. In various examples, the I/O components 802 may include user output components 826 and user input components 828. The user output components 826 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 828 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 802 may include biometric components 830, motion components 832, environmental components 836, or position components 834, among a wide array of other components. The motion components 832 include acceleration sensor components (e.g., accelerometer), gravitation sensor components, rotation sensor components (e.g., gyroscope).

The environmental components 836 include, for example, one or more image sensors or cameras (with still image/ photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 834 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 802 further include communication components 838 operable to couple the machine 800 to a network 822 or devices 824 via respective coupling or connections. For example, the communication components 838 may include a network interface component or another suitable device to interface with the network 822. In further examples, the communication components 838 may include wired communication components, wireless communication components, cellular communication components, Near Field Communication (NFC) components, Bluetooth® components (e.g., Bluetooth® Low Energy), Wi-FiR components, and other communication components to provide communication via other modalities. The devices 824 may be another machine or any of a wide variety of peripheral devices (e.g., a peripheral device coupled via a USB).

Moreover, the communication components 838 may detect identifiers or include components operable to detect identifiers. For example, the communication components 838 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 838, such as location via Internet Protocol (IP) geolocation, location via Wi-Fi® signal triangulation, location via detecting an NFC beacon signal that may indicate a particular location, and so forth.

The various memories (e.g., main memory 814, static memory 816, and memory of the processors 804) and storage unit 818 may store one or more sets of instructions and data structures (e.g., software) embodying or used by any one or more of the methodologies or functions described herein. These instructions (e.g., the instructions 810), when executed by processors 804, cause various operations to implement the disclosed examples.

The instructions 810 may be transmitted or received over the network 822, using a transmission medium, via a network interface device (e.g., a network interface component included in the communication components 838) and using any one of several well-known transfer protocols (e.g., hypertext transfer protocol (HTTP)). Similarly, the instructions 810 may be transmitted or received using a transmission medium via a coupling (e.g., a peer-to-peer coupling) to the devices 824.

Software Architecture

Figure 9:
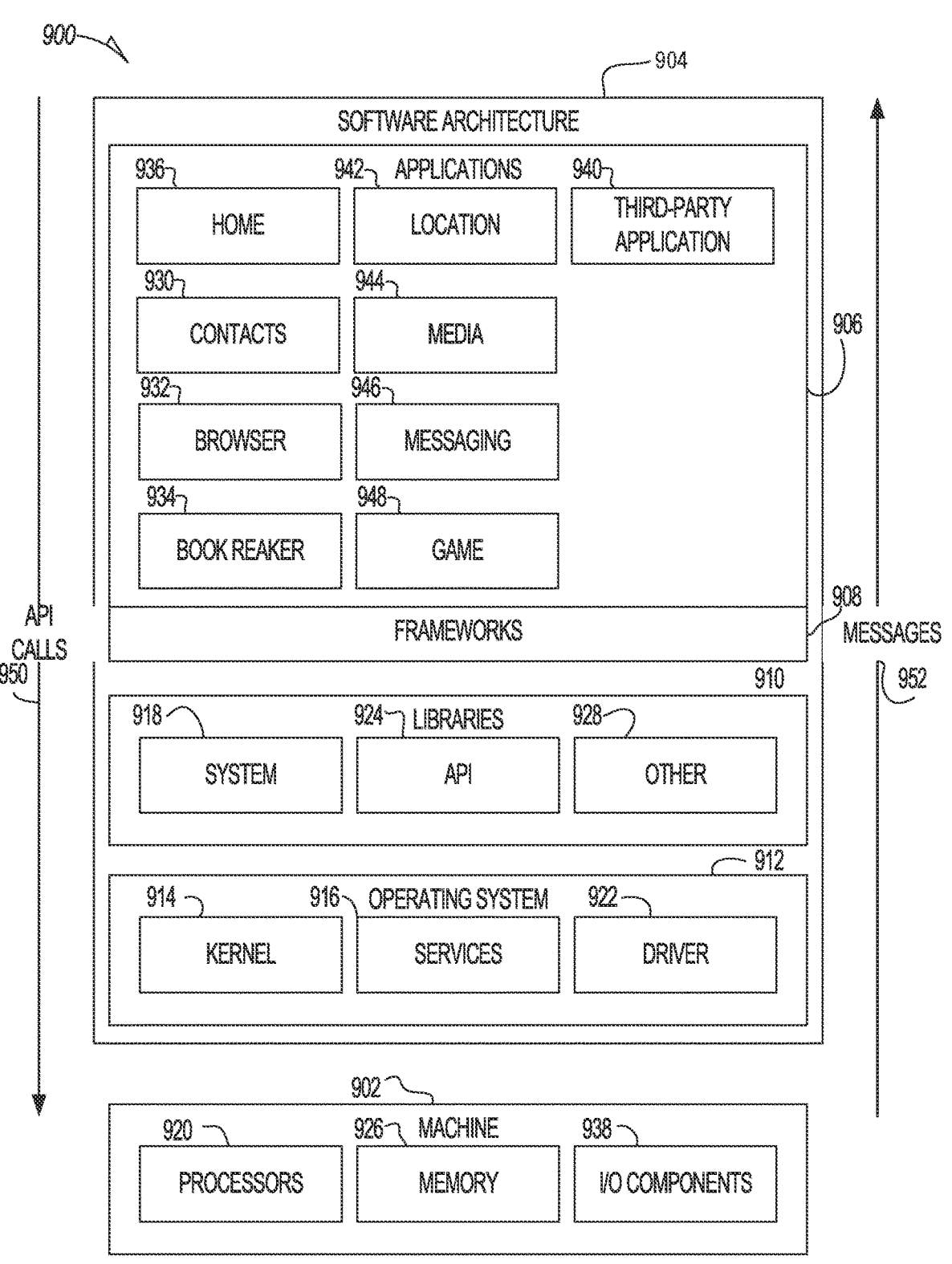
FIG. 9 is a block diagram illustrating a software architecture, which can be installed on any one or more of the devices described herein.

FIG. 9 is a block diagram 900 illustrating a software architecture 904, which can be installed on any one or more of the devices described herein. The software architecture 904 is supported by hardware such as a machine 902 that includes processors 920, memory 926, and I/O components 938. In this example, the software architecture 904 can be conceptualized as a stack of layers, where each layer provides a particular functionality. The software architecture 904 includes layers such as an operating system 912, libraries 910, frameworks 908, and applications 906. Operationally, the applications 906 invoke API calls 950 through the software stack and receive messages 952 in response to the API calls 950.

The operating system 912 manages hardware resources and provides common services. The operating system 912 includes, for example, a kernel 914, services 916, and drivers 922. The kernel 914 acts as an abstraction layer between the hardware and the other software layers. For example, the kernel 914 provides memory management, processor management (e.g., scheduling), component management, networking, and security settings, among other functionalities. The services 916 can provide other common services for the other software layers. The drivers 922 are responsible for controlling or interfacing with the underlying hardware. For instance, the drivers 922 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 910 provide a common low-level infrastructure used by the applications 906. The libraries 910 can include system libraries 918 (e.g., C standard library) that provide functions such as memory allocation functions, string manipulation functions, mathematic functions, and the like. In addition, the libraries 910 can include API libraries 924 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 910 can also include a wide variety of other libraries 928 to provide many other APIs to the applications 906.

The frameworks 908 provide a common high-level infrastructure that is used by the applications 906. For example, the frameworks 908 provide various graphical user interface (GUI) functions, high-level resource management, and high-level location services. The frameworks 908 can provide a broad spectrum of other APIs that can be used by the applications 906, some of which may be specific to a particular operating system or platform.

In an example, the applications 906 may include a home application 936, a contacts application 930, a browser application 932, a book reader application 934, a location application 942, a media application 944, a messaging application 946, a game application 948, and a broad assortment of other applications such as a third-party application 940. The applications 906 are programs that execute functions defined in the programs. Various programming languages can be employed to create one or more of the applications 906, structured in a variety of manners, such as object-oriented programming languages (e.g., Objective-C, Java, or C++) or procedural programming languages (e.g., C or assembly language). In a specific example, the third-party application 940 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 940 can invoke the API calls 950 provided by the operating system 912 to facilitate functionalities described herein.

We claim:

1. A system with an attention capacity service, the system comprising:
a processor; and
a memory storage device storing instructions thereon, which, when executed by the processor, cause the system to perform operations comprising:
receiving configuration data for the attention capacity service, the configuration data for the attention capacity service comprising a channel attention value for each channel of a plurality of channels;
receiving configuration data for an agent profile of an agent, the configuration data for the agent profile comprising i) an indication of one or more channels of the plurality of channels to enable for the agent, and ii) an indication of a maximum number of concurrent customer interactions the agent is configured to have across the one or more channels enabled for the agent;
responsive to receiving data indicating that the agent has accepted a first invitation to interact with a first customer via a first channel, i) updating a runtime available attention value for the agent by decreasing the runtime available attention value by the channel attention value configured for the first channel, and ii) increasing an active customer interaction count for the agent; and
communicating the updated runtime available attention value for the agent and active customer interaction count for the agent to a router of the system.

2. The system of claim 1, wherein the instructions, when executed by the processor, cause the system to perform additional operations comprising:
receiving data indicating that the agent has accepted a second invitation to interact with a second customer via a second channel;
responsive to receiving the data indicating that the agent has accepted the second invitation to interact with the second customer via the second channel, i) updating the runtime available attention value for the agent by decreasing the runtime available attention value by the channel attention value configured for the second channel, and ii) increasing the active customer interaction count for the agent; and
communicating the updated runtime available attention value for the agent and the active customer interaction count for the agent to a router of the system.

3. The system of claim 2, wherein the instructions, when executed by the processor, cause the system to perform additional operations comprising:
receiving data indicating that the agent has completed an interaction with the first customer via the first channel;
responsive to receiving the data indicating that the agent has completed the interaction with the first customer via the first channel, i) updating the runtime available attention value for the agent by increasing the runtime available attention value by the channel attention value configured for the first channel, and ii) decreasing the active customer interaction count for the agent; and
communicating the updated runtime available attention value for the agent and the active customer interaction count for the agent to a router of the system.

4. The system of claim 1, wherein the plurality of channels comprise:
a video channel;
a voice channel;
a webchat channel;
an SMS messaging channel;
a social media messaging channel;

an email channel; or any combination thereof.

5. The system of claim 1, wherein the plurality of channels comprise:

a video channel or a voice channel; and a webchat channel;

wherein the channel attention value configured for the video channel or the voice channel is greater than the channel attention value configured for the webchat channel.

6. The system of claim 2, wherein the instructions, when executed by the processor, cause the system to perform additional operations comprising:

receiving, at the router, an incoming customer interaction request via the first channel; and determining, by the router, that the agent is not to receive an invitation to accept the customer interaction because the channel attention value configured for the first channel exceeds the runtime available attention value for the agent.

7. The system of claim 2, wherein the instructions, when executed by the processor, cause the system to perform additional operations comprising:

receiving, at the router, an incoming customer interaction request from a third customer via the first channel;

determining that the channel attention value configured for the first channel exceeds the runtime available attention value for the agent; and responsive to determining that the channel attention value configured for the first channel exceeds the runtime available attention value for the agent, causing a user interface to be presented to the agent, the user interface prompting the agent to complete a customer interaction with the first customer to accept an invitation to interact with the third customer via the first channel.

8. A computer-implemented method comprising:

receiving configuration data for an attention capacity service, the configuration data for the attention capacity service comprising a channel attention value for each channel of a plurality of channels;

receiving configuration data for an agent profile of an agent, the configuration data for the agent profile comprising i) an indication of one or more channels of the plurality of channels to enable for the agent, and ii) an indication of a maximum number of concurrent customer interactions the agent is configured to have across the one or more channels enabled for the agent;

responsive to receiving data indicating that the agent has been sent a first invitation to interact with a first customer via a first channel, i) updating a runtime available attention value for the agent by decreasing the runtime available attention value by the channel attention value configured for the first channel, and ii) increasing an active customer interaction count for the agent; and communicating the updated runtime available attention value for the agent and active customer interaction count for the agent to a router.

9. The computer-implemented method of claim 8, further comprising:

receiving data indicating that the agent has been sent a second invitation to interact with a second customer via a second channel;

responsive to receiving the data indicating that the agent has been sent the second invitation to interact with the second customer via the second channel, i) updating the runtime available attention value for the agent by decreasing the runtime available attention value by the channel attention value configured for the second channel, and ii) increasing the active customer interaction count for the agent; and communicating the updated runtime available attention value for the agent and the active customer interaction count for the agent to a router.

10. The computer-implemented method of claim 9, further comprising:

receiving data indicating that the agent has completed an interaction with the first customer via the first channel;

responsive to receiving the data indicating that the agent has completed the interaction with the first customer via the first channel, i) updating the runtime available attention value for the agent by increasing the runtime available attention value by the channel attention value configured for the first channel, and ii) decreasing the active customer interaction count for the agent; and communicating the updated runtime available attention value for the agent and the active customer interaction count for the agent to a router.

11. The computer-implemented method of claim 8, wherein the plurality of channels comprise:

a video channel;

a voice channel;

a webchat channel;

an SMS messaging channel;

a social media messaging channel;

an email channel; or any combination thereof.

12. The computer-implemented method of claim 8, wherein the plurality of channels comprise:

a video channel or a voice channel; and a webchat channel;

wherein the channel attention value configured for the video channel or the voice channel is greater than the channel attention value configured for the webchat channel.

13. The computer-implemented method of claim 9, further comprising:

receiving, at the router, an incoming customer interaction request via the first channel; and determining, by the router, that the agent is not to receive an invitation to accept the customer interaction because the channel attention value configured for the first channel exceeds the runtime available attention value for the agent.

14. The computer-implemented method of claim 9, further comprising:

receiving, at the router, an incoming customer interaction request from a third customer via the first channel;

determining that the channel attention value configured for the first channel exceeds the runtime available attention value for the agent; and responsive to determining that the channel attention value configured for the first channel exceeds the runtime available attention value for the agent, causing a user interface to be presented to the agent, the user interface prompting the agent to complete a customer interaction with the first customer to accept an invitation to interact with the third customer via the first channel.

15. A non-transitory memory storage device storing instructions thereon, which, when executed by a processor of a customer interaction system, will cause the customer interaction system to perform operations comprising:

receiving configuration data for an attention capacity service, the configuration data for the attention capacity service comprising a channel attention value for each channel of a plurality of channels;

receiving configuration data for an agent profile of an agent, the configuration data for the agent profile comprising i) an indication of one or more channels of the plurality of channels to enable for the agent, and ii) an indication of a maximum number of concurrent customer interactions the agent is configured to have across the channels enabled for the agent;

responsive to receiving data indicating that the agent has been sent a first invitation to interact with a first customer via a first channel, i) updating a runtime available attention value for the agent by decreasing the runtime available attention value by the channel attention value configured for the first channel, and ii) increasing an active customer interaction count for the agent; and communicating the updated runtime available attention value for the agent and active customer interaction count for the agent to a router of the customer interaction system.

16. The memory storage device of claim 15 wherein the instructions, when executed by the processor, cause the customer interaction system to perform additional operations comprising:

receiving data indicating that the agent has accepted a second invitation to interact with a second customer via a second channel;

responsive to receiving the data indicating that the agent has accepted the second invitation to interact with the second customer via the second channel, i) updating the runtime available attention value for the agent by decreasing the runtime available attention value by the channel attention value configured for the second channel, and ii) increasing the active customer interaction count for the agent; and communicating the updated runtime available attention value for the agent and the active customer interaction count for the agent to a router of the customer interaction system.

17. The memory storage device of claim 15 wherein the instructions, when executed by the processor, cause the customer interaction system to perform additional operations comprising:

receiving data indicating that the agent has completed an interaction with the first customer via the first channel;

responsive to receiving the data indicating that the agent has completed the interaction with the first customer via the first channel, i) updating the runtime available attention value for the agent by increasing the runtime available attention value by the channel attention value configured for the first channel, and ii) decreasing the active customer interaction count for the agent, and communicating the updated runtime available attention value for the agent and the active customer interaction count for the agent to a router of the customer interaction system.

18. The memory storage device of claim 15, wherein the plurality of channels comprise:

a video channel;

a voice channel;

a webchat channel;

an SMS messaging channel;

a social media messaging channel;

an email channel; or any combination thereof.

19. The memory storage device of claim 15 wherein instructions, wherein the plurality of channels comprise:

a video channel or a voice channel; and a webchat channel;

wherein the channel attention value configured for the video channel or the voice channel is greater than the channel attention value for the webchat channel.

20. The memory storage device of claim 15 wherein the instructions, when executed by the processor, cause the customer interaction system to perform additional operations comprising:

receiving, at the router, an incoming customer interaction request via the first channel; and determining, by the router, that the agent is not to receive an invitation to accept the customer interaction request because the channel attention value configured for the first channel exceeds the runtime available attention value for the agent.

* * * * *